US012563542B2

(12) United States Patent
Baek et al.

(10) Patent No.: US 12,563,542 B2
(45) Date of Patent: Feb. 24, 2026

(54) PROTECTION OF RESTRICTED TWT OPERATION

(71) Applicant: LG ELECTRONICS INC., Seoul (KR)

(72) Inventors: Sunhee Baek, Seoul (KR); Jeongki Kim, Seoul (KR); Jinsoo Choi, Seoul (KR); Namyeong Kim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 348 days.

(21) Appl. No.: 18/036,634

(22) PCT Filed: Nov. 22, 2021

(86) PCT No.: PCT/KR2021/017150

§ 371 (c)(1),
(2) Date: May 11, 2023

(87) PCT Pub. No.: WO2022/108404

PCT Pub. Date: May 27, 2022

(65) Prior Publication Data

US 2023/0422234 A1      Dec. 28, 2023

(30) Foreign Application Priority Data

Nov. 20, 2020    (KR) ........................ 10-2020-0156875
Jan. 12, 2021    (KR) ........................ 10-2021-0004120

(51) Int. Cl.
*H04W 72/12*        (2023.01)
*H04W 84/12*        (2009.01)
(52) U.S. Cl.
CPC ............ *H04W 72/12* (2013.01); *H04W 84/12* (2013.01)

(58) Field of Classification Search
None
See application file for complete search history.

(56) References Cited

U.S. PATENT DOCUMENTS 11,638,216 B2 *  4/2023  Hu .................... H04W 52/0248
                                                          370/311
2017/0311258 A1 * 10/2017 Asterjadhi ........ H04W 28/0221
                        (Continued)

FOREIGN PATENT DOCUMENTS

KR       1020190107600      9/2019
KR       1020200006006      1/2020
WO        2020013874        1/2020

OTHER PUBLICATIONS

PCT International Application No. PCT/KR2021/017150, International Search Report dated Feb. 22, 2022, 2 pages.
(Continued)

*Primary Examiner* — Hong S Cho
(74) *Attorney, Agent, or Firm* — LEE, HONG, DEGERMAN, KANG & WAIMEY

(57)                ABSTRACT

The present specification proposes various methods for transmitting restricted TWT scheduling information. According to an embodiment of the present invention, the restricted TWT scheduling information can be transmitted through a beacon frame and another beacon frame other than the beacon frame. According to another embodiment described in the present specification, the restricted TWT scheduling information can be transmitted through a beacon frame and response information to request information transmitted by an STA that has not received the beacon frame.

15 Claims, 23 Drawing Sheets

(56)　　　　　References Cited

U.S. PATENT DOCUMENTS

2019/0053155 A1*　2/2019　Kneckt　................ H04W 72/23
2020/0374754 A1*　11/2020　Chu　.................... H04W 28/082
2022/0070772 A1*　3/2022　Ho　...................... H04W 72/569
2023/0389000 A1*　11/2023　Dong　............... H04W 56/0045

OTHER PUBLICATIONS

Hu et al., "Protected TWT Enahancement for Latency Sensitive Traffic," IEEE 802.11-20/1046r1, Jul. 2020, 20 pages.
Baron et al., "Low-Latency Triggered TWT," IEEE 802.11-20/11843r0, Nov. 2020, 12 pages.

* cited by examiner (a)

Figure 4:
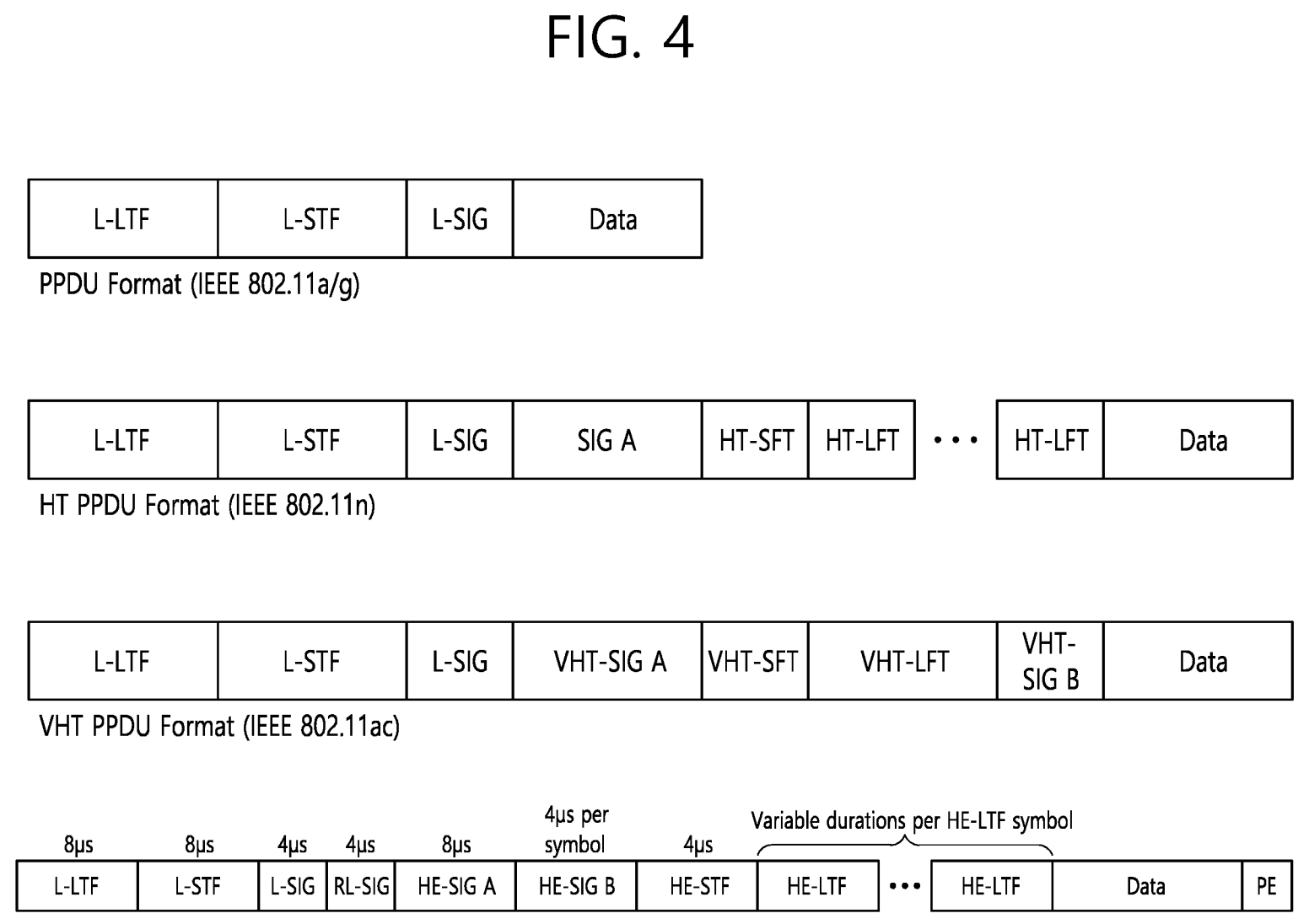

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ··· | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| 8μs | 8μs | 4μs | 4μs | 8μs | 4μs per symbol | 4μs | | | |
|---|---|---|---|---|---|---|---|---|---|
| L-LTF | L-STF | L-SIG | RL-SIG | HE-SIG A | HE-SIG B | HE-STF | HE-LTF | ··· HE-LTF | Data | PE |

Variable durations per HE-LTF symbol

FIG. 10

| L-STF | L-LTF | L-SIG | RL-SIG | U-SIG | EHT-SIG | EHT-STF | EHT-LTF | Data |

Transmitting request information to AP —S2110

Receiving response information from AP —S2120

Determining whether to terminate its TXOP based on response information —S2130

Transmitting beacon frame — S2310

Receiving request information from STA — S2320

Transmitting response information to STA in response to request information — S2330

PROTECTION OF RESTRICTED TWT OPERATION

CROSS-REFERENCE OF RELATED APPLICATION(S)

This application is the National Stage filing under 35 U.S.C. 371 of International Application No. PCT/KR2021/017150, filed on Nov. 22, 2021, which claims the benefit of earlier filing date and right of priority to Korean Application Nos. 10-2020-0156875, filed on Nov. 20, 2020, and 10-2021-0004120, filed on Jan. 12, 2021, the contents of which are all incorporated by reference herein in their entirety.

TECHNICAL FIELD

This specification relates to a wireless LAN system.

BACKGROUND

A wireless local area network (WLAN) has been enhanced in various ways. For example, the IEEE 802.11ax standard has proposed an enhanced communication environment by using orthogonal frequency division multiple access (OFDMA) and downlink multi-user multiple input multiple output (DL MU MIMO) schemes.

As wired/wireless traffic has recently exploded, traffic sensitive to time delay has also increased significantly. Traffic that is sensitive to time delay is real-time audio/video transmission, and the need to support it in a wireless environment has increased along with the proliferation of multimedia devices. However, in a wireless environment rather than a wired environment, there are many considerations to support traffic sensitive to time delay. This is because transmission speed is lower than wired transmission and interference from surroundings also occurs.

In particular, since Wi-Fi is a communication system that should compete equally in the ISM band without channel monopolization by a central base station, it is relatively difficult to support traffic sensitive to time delay. However, as described above, since traffic sensitive to time delay is increasing recently, a Wi-Fi technology for supporting this is required. This specification proposes a technique for supporting traffic sensitive to time delay.

SUMMARY

The present specification proposes various methods for transmitting restricted TWT scheduling information. According to an embodiment of the present specification, the restricted TWT scheduling information may be transmitted through a beacon frame and a frame other than the beacon frame. According to another embodiment of the present specification, the restricted TWT scheduling information may be transmitted through a beacon frame and response information for request information transmitted by an STA that has not received the beacon frame.

According to the present specification, it is possible to increase the success rate of receiving the STA's restricted TWT scheduling information. Therefore, since the restricted TWT operation of the STA for which the restricted TWT SP is set is protected, and the transmission and reception of latency-sensitive traffic/data is protected, communication efficiency can be increased.

BRIEF DESCRIPTION OF THE DRAWINGS

FIG. 4 illustrates an example of a PPDU used in an IEEE standard.

FIG. 10 illustrates an example of a PPDU used in the present specification.

DETAILED DESCRIPTION

Figure 1:
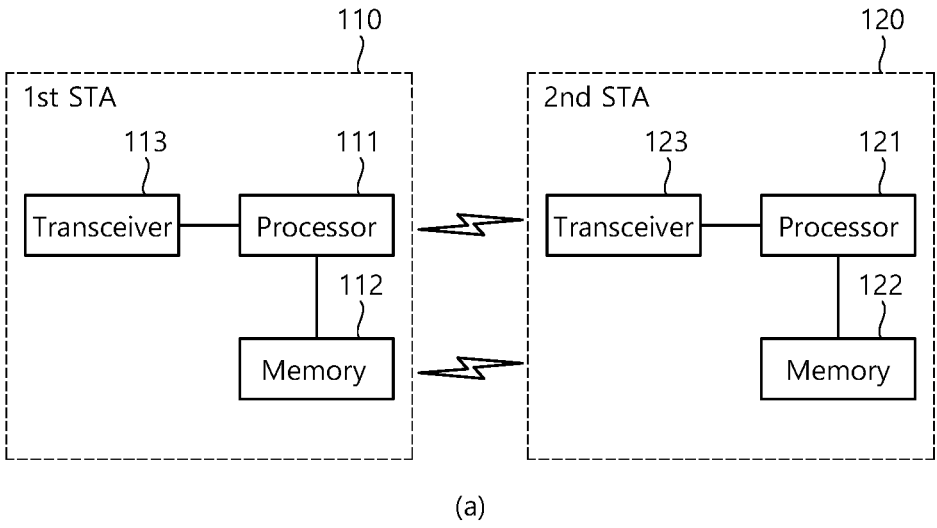
FIG. 1 shows an example of a transmitting apparatus and/or receiving apparatus of the present specification.
Figure 1:
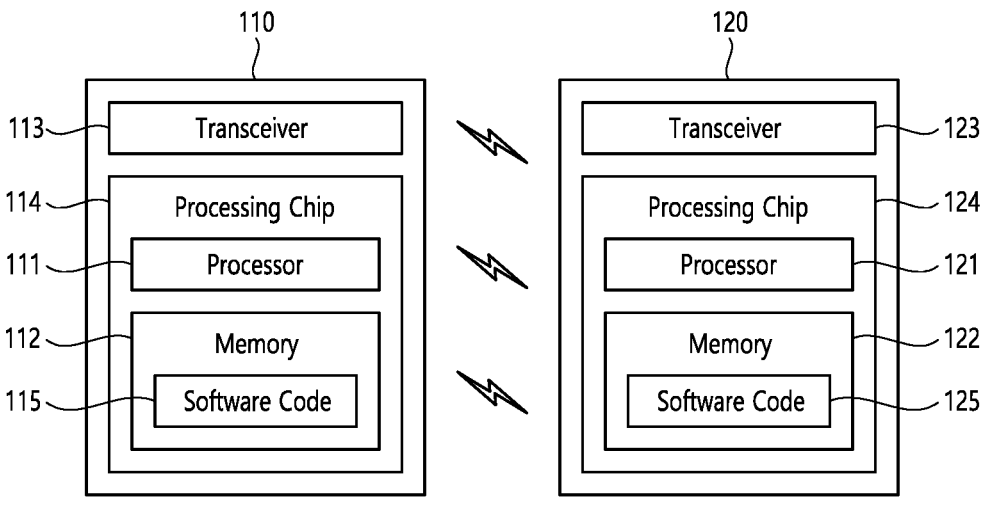

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an AP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
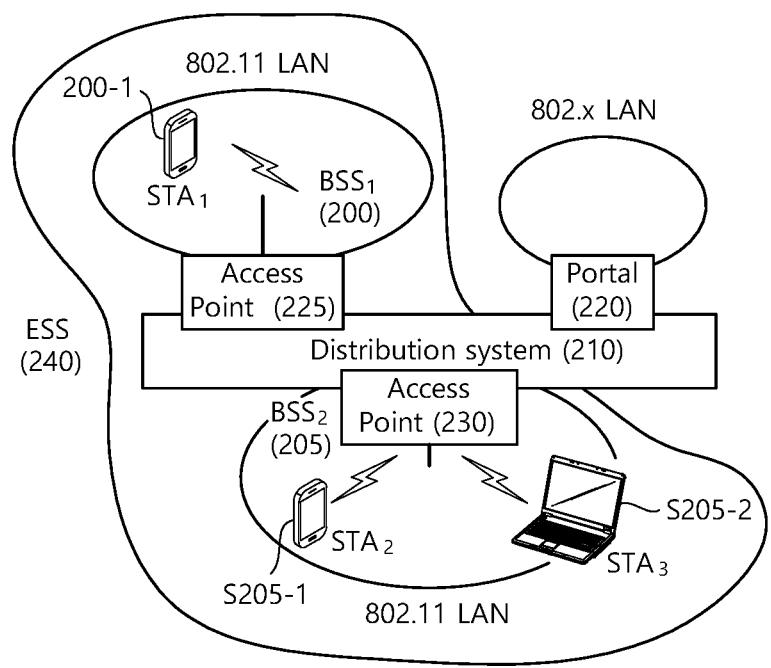
FIG. 2 is a conceptual view illustrating the structure of a wireless local area network (WLAN).
Figure 2:
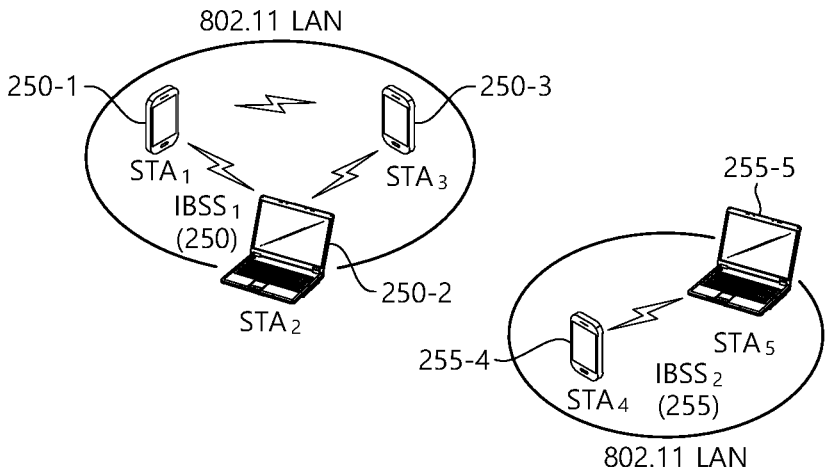

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
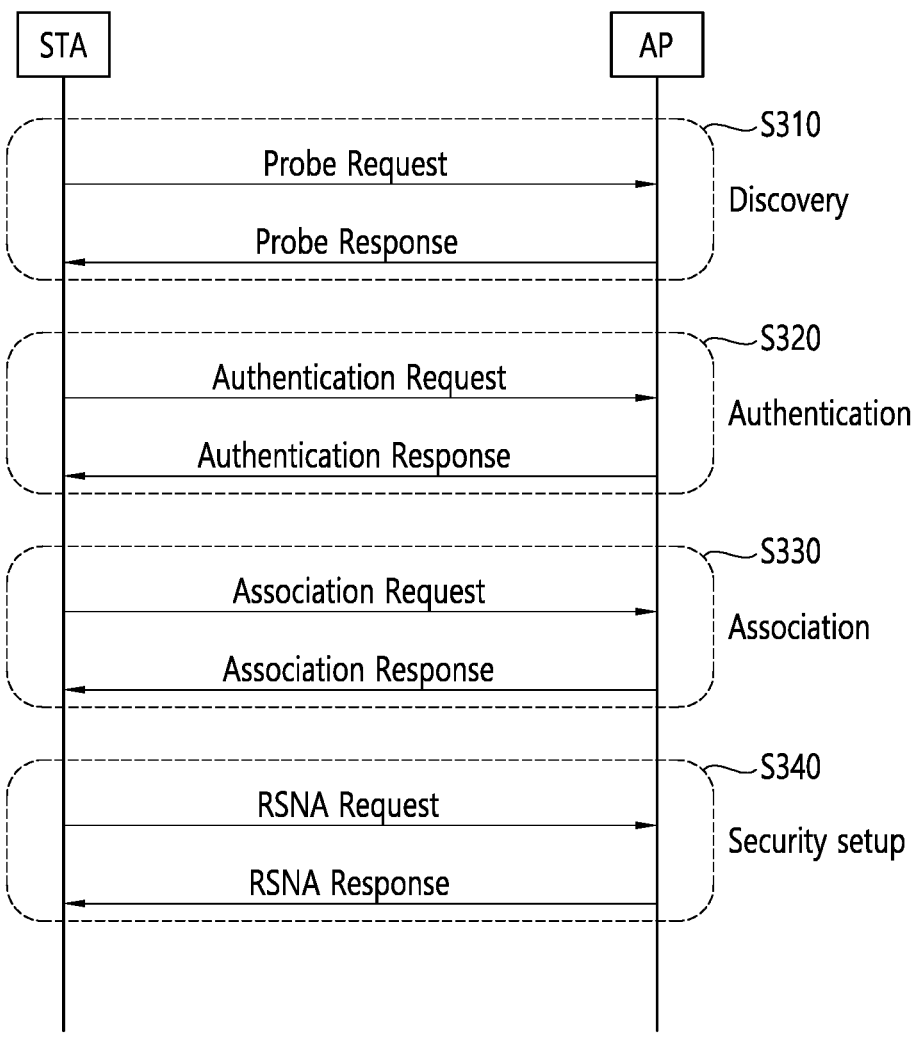
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
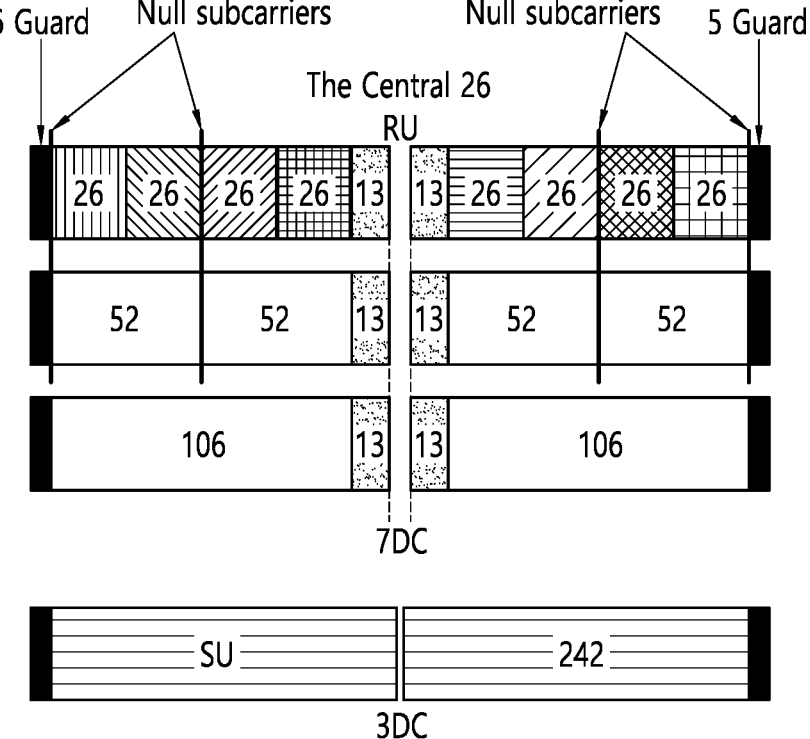
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
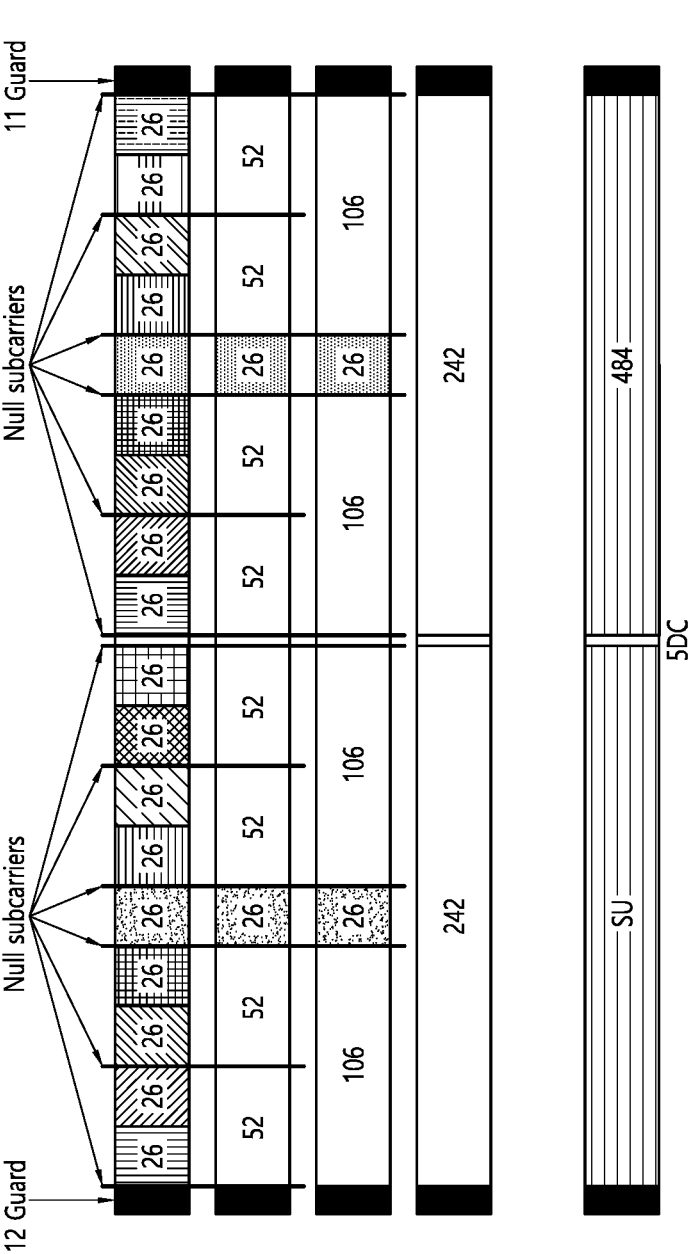
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
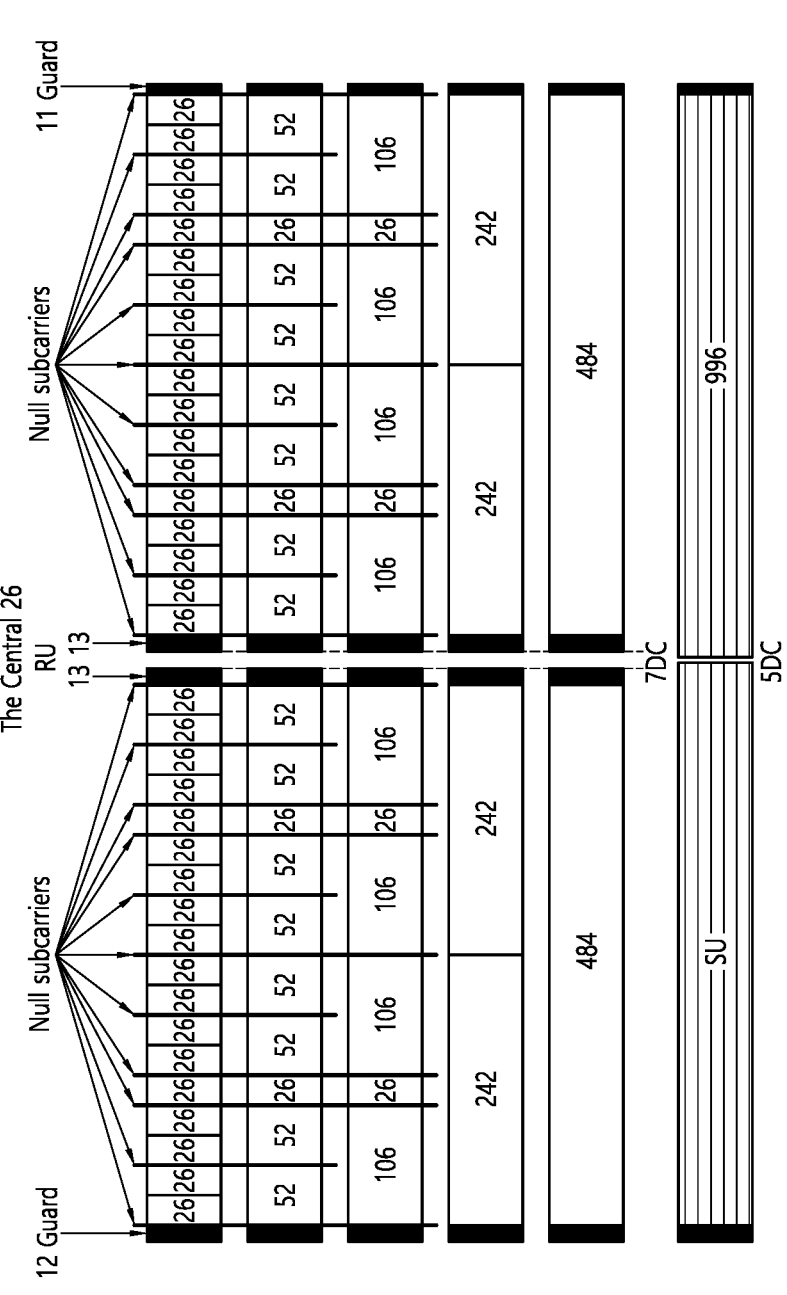
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
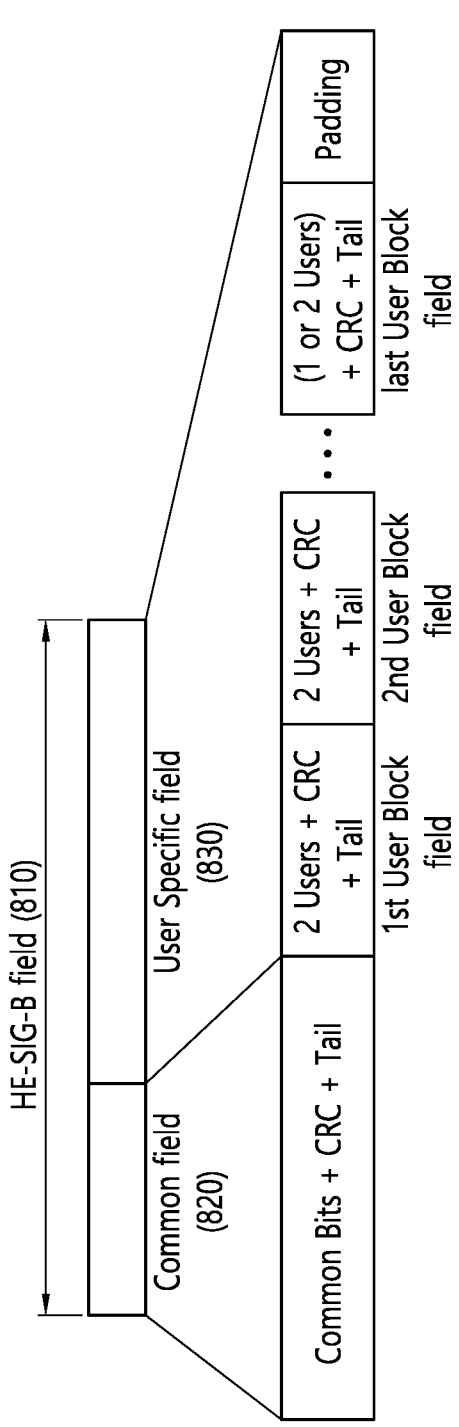
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
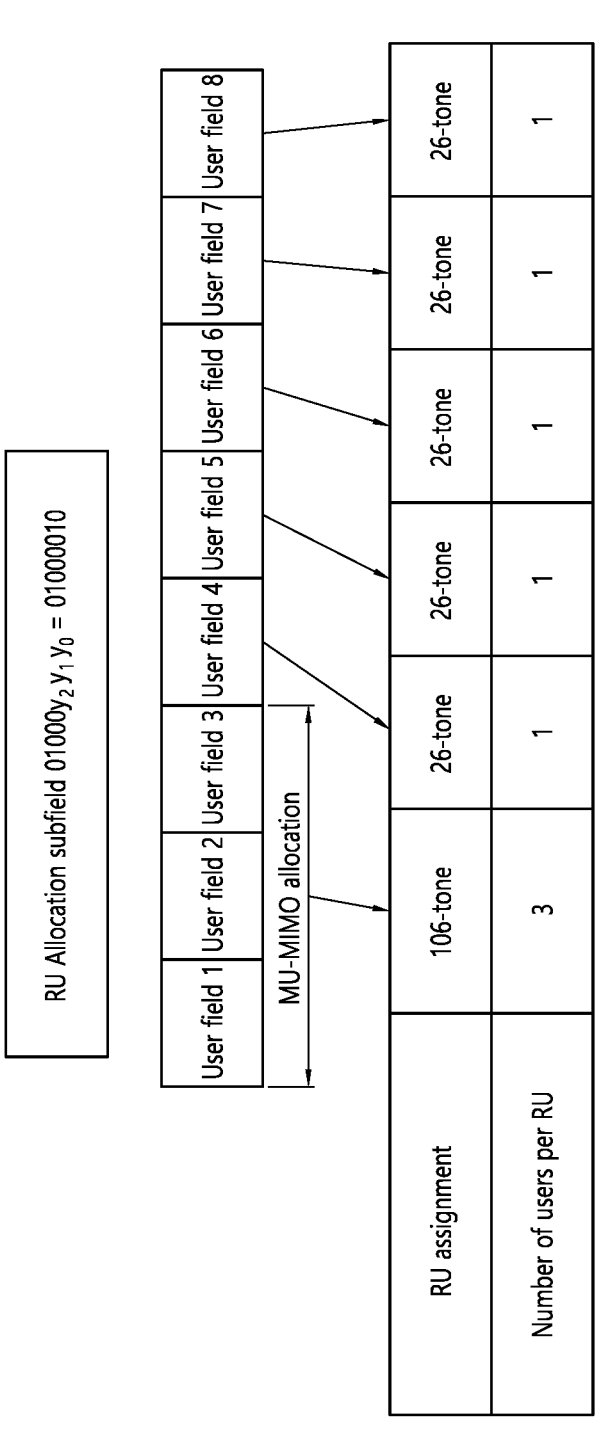
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
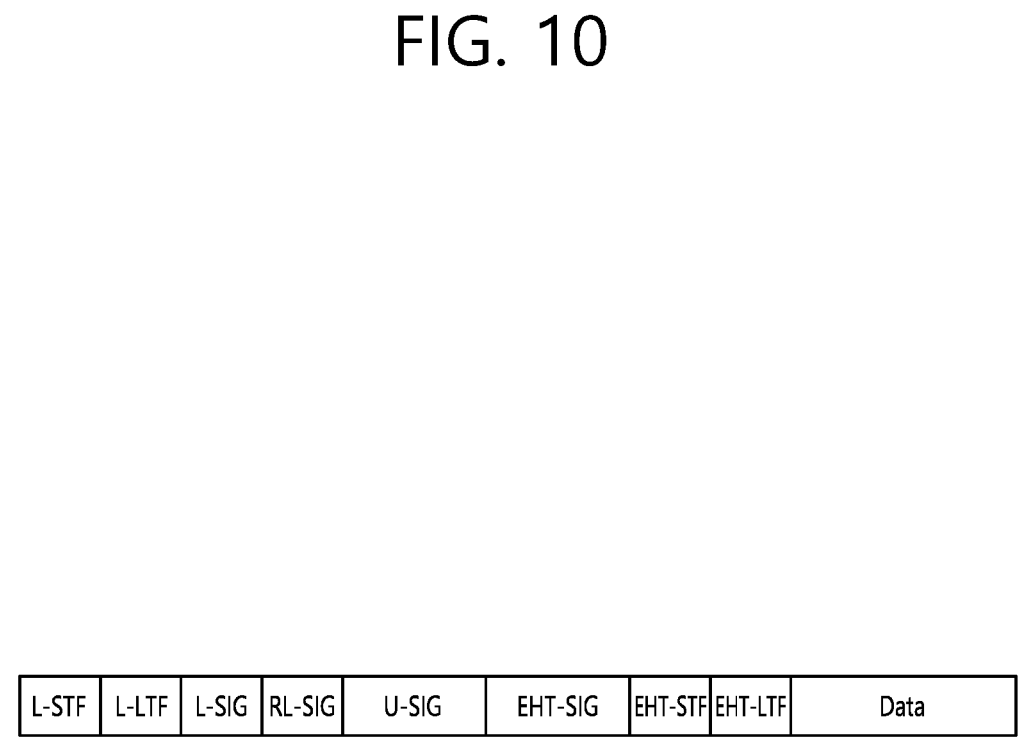

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 µs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BP SK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
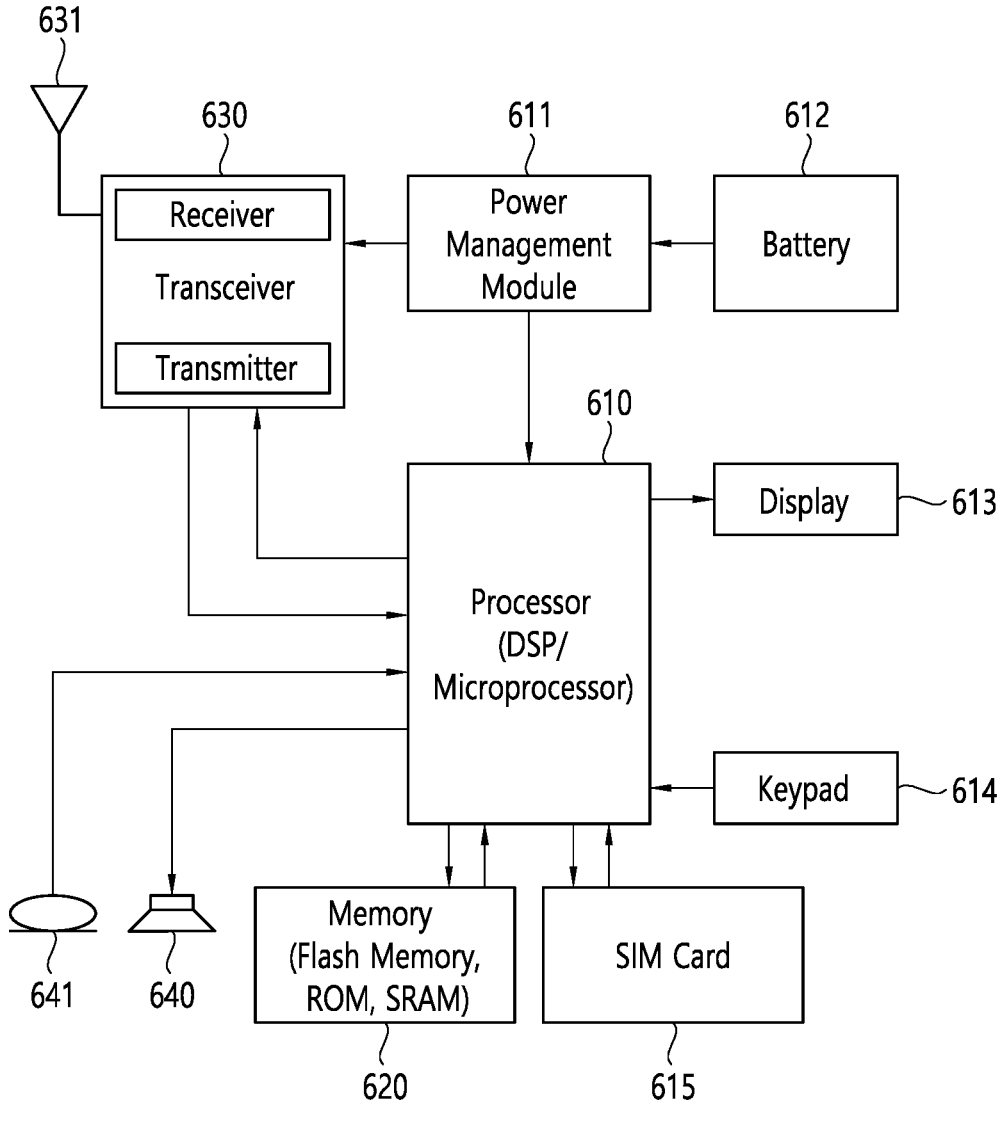
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Figure 12:
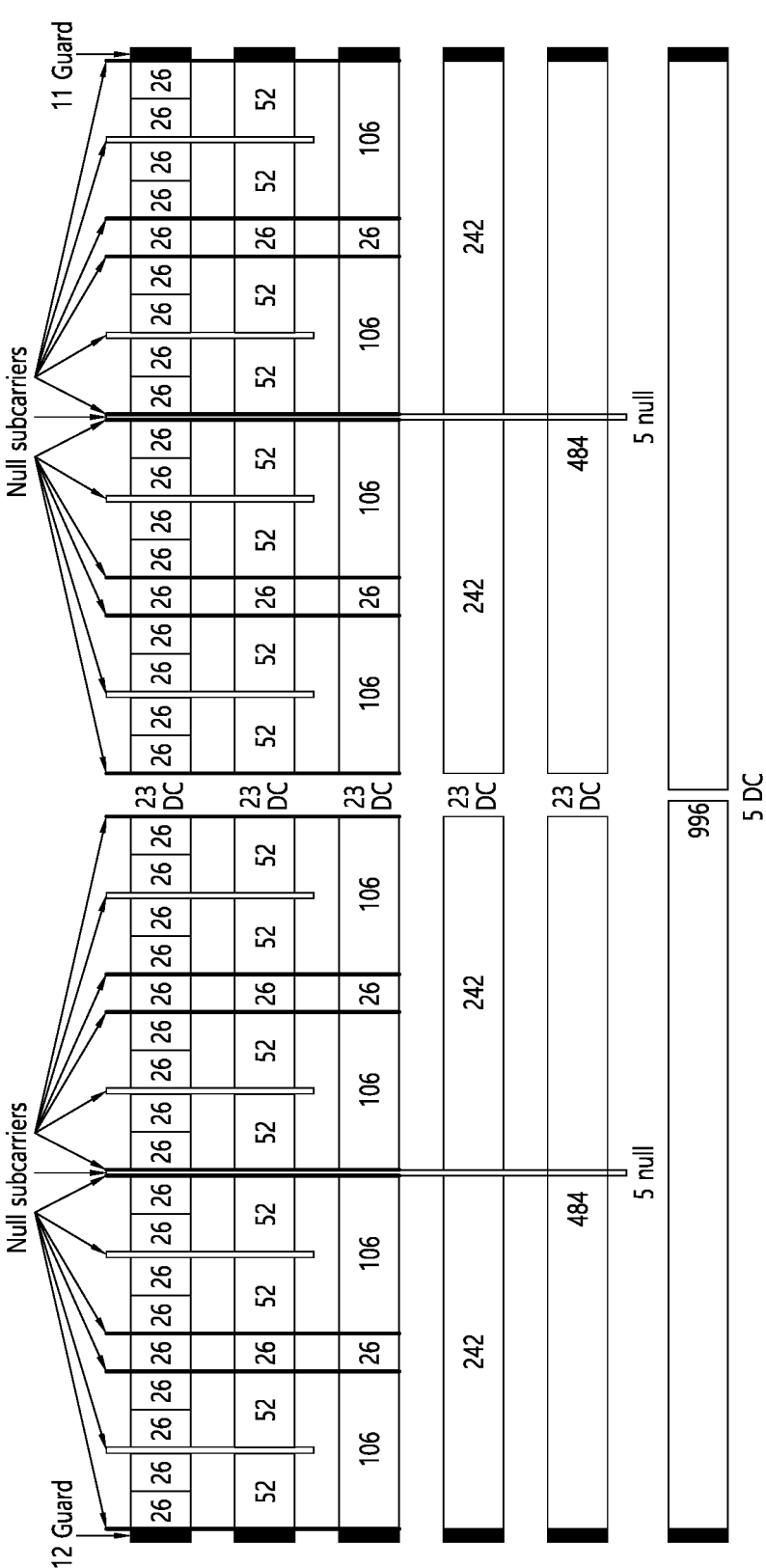
FIG. 12 is a diagram showing the arrangement of resource units (RUs) used on the 80 MHz band.

FIG. 12 is a diagram showing the arrangement of resource units (RUs) used on the 80 MHz band.

The arrangement of resource units (RUs) used in the present specification may be variously changed. For example, the arrangement of resource units (RUs) used on the 80 MHz band may be variously changed. For example, the arrangement of resource units (RUs) used on the 80 MHz band may be configured based on FIG. 12 rather than FIG. 7.

The tone-plan for 160/240/320 MHz may be configured in the form of repeating the pattern of FIG. 12 several times.

Figure 13:
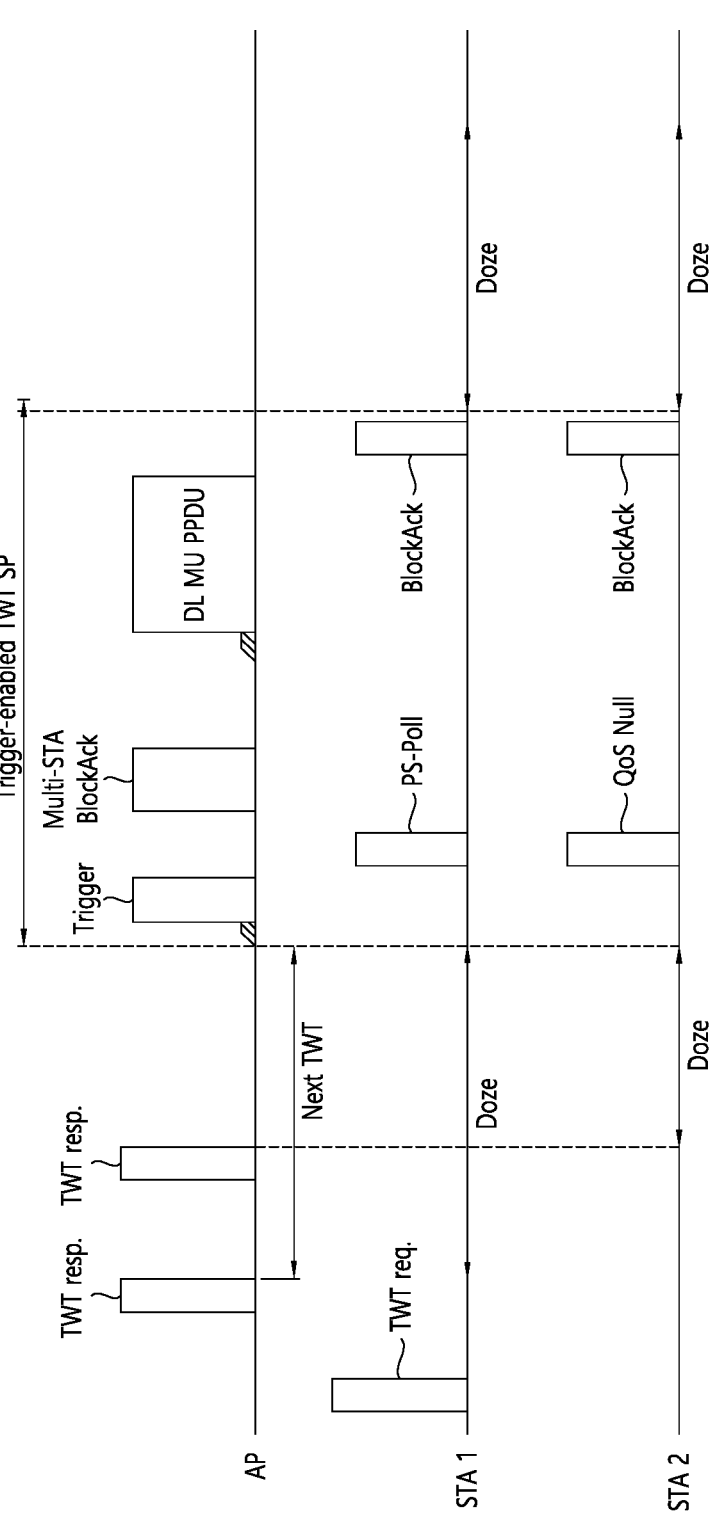
FIG. 13 shows an example of individual TWT operation.
Figure 14:
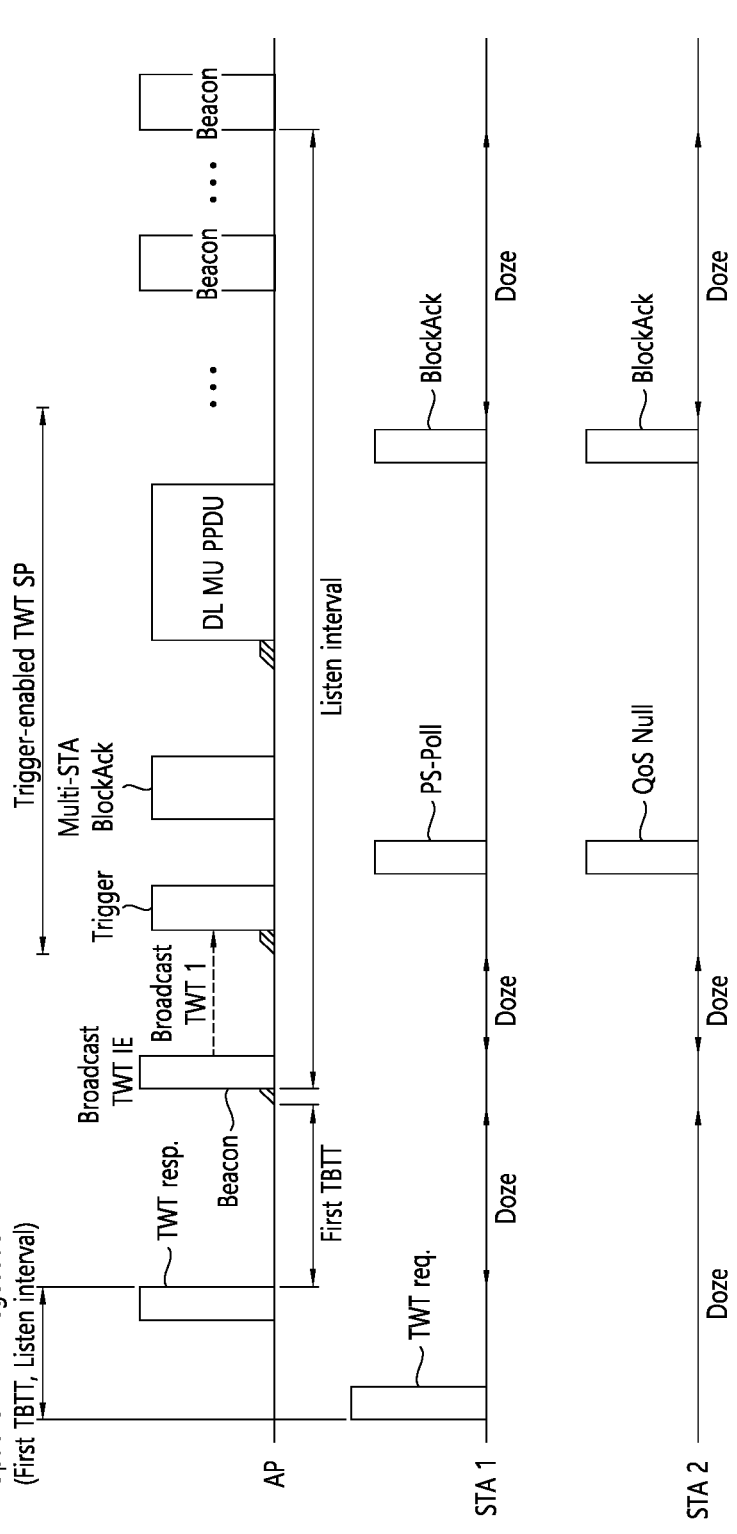
FIG. 14 shows an example of a broadcast TWT operation.

Hereinafter, TWT (Target Wake Time) will be described with reference to FIGS. 13 and 14. FIG. 13 shows an example of individual TWT operation. FIG. 14 shows an example of a broadcast TWT operation.

The TWT defines a Service Period (SP) between an AP and a non-AP STA and shares information about the SP to reduce media contention, thereby improving the energy efficiency of non-AP STAs in 11ax's PS (Power Saving) technology. An STA that performs Request/Suggest/Demand in the TWT setup step may be referred to as a TWT Requesting STA. In addition, an AP that responds to the request, such as accept/reject, may be referred to as a TWT responding STA. The setup step may include a process of determining/defining a TWT request from an STA to an AP, a type of a TWT operation to be performed, and a frame type to be transmitted and received. The TWT operation can be classified into an individual TWT and a broadcast TWT.

The individual TWT is a mechanism to perform data exchange, after the AP and the non-AP STA negotiate the wake/dozes status of the non-AP STA through transmission and reception of TWT Request/Response frames. FIG. 13 shows an example of the operation of an individual TWT. The AP and the STA1 may configure a trigger-enabled TWT agreement through the TWT request frame and the TWT response frame. At this time, the method used by the STA1 is a solicited TWT method. When the STA1 transmits a TWT request frame to the AP, the STA1 receives information for TWT operation from the AP through a TWT response frame. On the other hand, the STA2 performing the Unsolicited TWT scheme may receive information on trigger-enabled TWT agreement setting from the AP through an Unsolicited TWT response. Specifically, the STA2 may calculate the next TWT by adding a specific number from the current TWT value. During a trigger-enabled TWT SP, the AP may transmit a trigger frame to STAs. The trigger frame may inform the AP that there is buffered data. In this regard, the STA1 may inform the AP of its Awake state by transmitting a PS-Poll frame. In addition, the STA2 may inform the AP of its activated state by transmitting a QoS Null frame. At this time, the data frames transmitted by the STA1 and the STA2 may be frames in a TB PPDU format. After checking the states of the STA1 and the STA2, the AP may transmit a DL MU PPDU to activated STAs. When the corresponding TWT SP expires, the STA1 and the STA2 may switch to a doze state.

The broadcast TWT is a TWT method in which anon-AP STA (TWT Scheduling STA) transmits and receives TWT request/response frames with the AP (TWT Scheduled STA) to obtain information on TBTT (Target Beacon Transmission Time) and Listen Interval. At this time, a negotiation operation for TBTT may be performed. Based on this, the AP may define a frame including TWT scheduling information through a beacon frame. In FIG. 14, the STA 1 performs a requested TWT operation, and the STA2 performs a non-requested TWT operation. The AP may transmit the DL MU PPDU after checking the Awake state of the STAs through the trigger transmitted by the AP. This may be the same as the process of the individual TWT. Meanwhile, in the broadcast TWT, a Trigger-enabled SP including a beacon frame may be repeated several times at regular intervals.

Meanwhile, as an example, time delay in the present specification may mean delay/latency defined in IEEE 802.11ax. That is, the time delay in the present specification may mean the time 1) from when the corresponding frame enters the queue of the MAC layer of the transmitting STA, transmission of the transmitting STA in the PHY layer is successfully completed, and the transmitting STA receives an ACK/(Block ACK) from the receiving STA, 2) to until the corresponding frame is deleted from the queue of the MAC layer of the transmitting STA. In addition, in the present specification, a non-AP STA supporting transmission of latency sensitive data may be referred to as a low latency STA. In addition, a non-AP supporting transmission of data that is not latency-sensitive data, i.e., regular data, may be referred to as a regular STA.

Meanwhile, in the present specification, the latency-sensitive data may be data included in a predefined access category (AC). Also, in the present specification, the latency-sensitive data may be data to which a predefined traffic identifier (TID) is assigned. Also, in the present specification, the low-latency STA may be an STA that supports restricted TWT operation. In addition, in the present specification, a regular STA may be another STA that supports a restricted TWT operation, an STA that does not support a restricted TWT operation, or an STA that transmits during a restricted TWT SP of another STA.

Hereinafter, a restricted TWT operation will be described.

The restricted TWT is a technology in which a low-latency STA transmitting latency-sensitive data preferentially secures the transmission time of the corresponding data using broadcast TWT. That is, if a non-AP STA capable of transmitting the latency-sensitive traffic/data supports the restricted TWT, the STA can transmit/receive the latency-sensitive traffic/data within a restricted TWT SP allocated from an associated AP.

The low-latency STA may inform the AP that it supports the restricted TWT of the broadcast TWT and should transmit data based on this. If the AP supports the restricted TWT, the AP may transmit a beacon including scheduling information of TWTs requested by each STA to the low-latency STA and the regular STA. In addition, a separate TXOP may proceed within the restricted TWT SP using (MU) RTS/CTS or CTS-to-self. At this time, if the TXOP of another STA proceeds before the low-latency STA's protected TWT SP (e.g., restricted TWT SP set to the low-latency STA) starts, the TXOP may be terminated. In addition, the TXOP may additionally proceed after the TWT SP protected by the low-latency STA ends.

The restricted TWT is a new technology for low latency applied to 802.11be broadcast TWT. In the broadcast TWT of 802.11ax, there is no TWT protection function using the NAV protection technology of individual TWTs. To this end, a space/resource reserved in the Request Type field format of the Broadcast TWT Parameter Set field may be used to indicate whether restricted TWT is supported.

What the TWT protection of the individual TWT and the restricted TWT of the broadcast TWT have in common is the use of NAV protection mechanisms such as (MU) RTS/CTS or CTS-to-self frames when activated. However, in the case of the individual TWT, since the STA performing the TWT operation has to wait until the previous STA's transmission is completed, the STA may not be able to grasp the start time of the corresponding SP. Therefore, a transmission delay problem may occur. In addition, since the STA cannot predict a transmission time point, a transmission delay problem may be further aggravated when latency-sensitive data is transmitted. In the case of the broadcast TWT, the NAV protection mechanism that secures the TXOP within the TWT SP of an individual TWT is used as it is, but the previous transmission can be stopped/terminated by increasing a transmission priority of the restricted TWT. Through this, the low-latency STA can predict the transmission scheduling of the protected TWT SP that has not been secured in the individual TWT.

In 802.11be, a technique for supporting the operation mode of the aforementioned restricted TWT is proposed. Specifically, EHT non-AP STAs that support the announced restricted TWT SPs and are associated with the AP announcing the restricted TWT SP at the same time may end/terminate their TXOP before the start time of the corresponding restricted TWT SP. Therefore, a more predictable low-latency service can be provided for latency-sensitive traffic/data.

Figure 15:
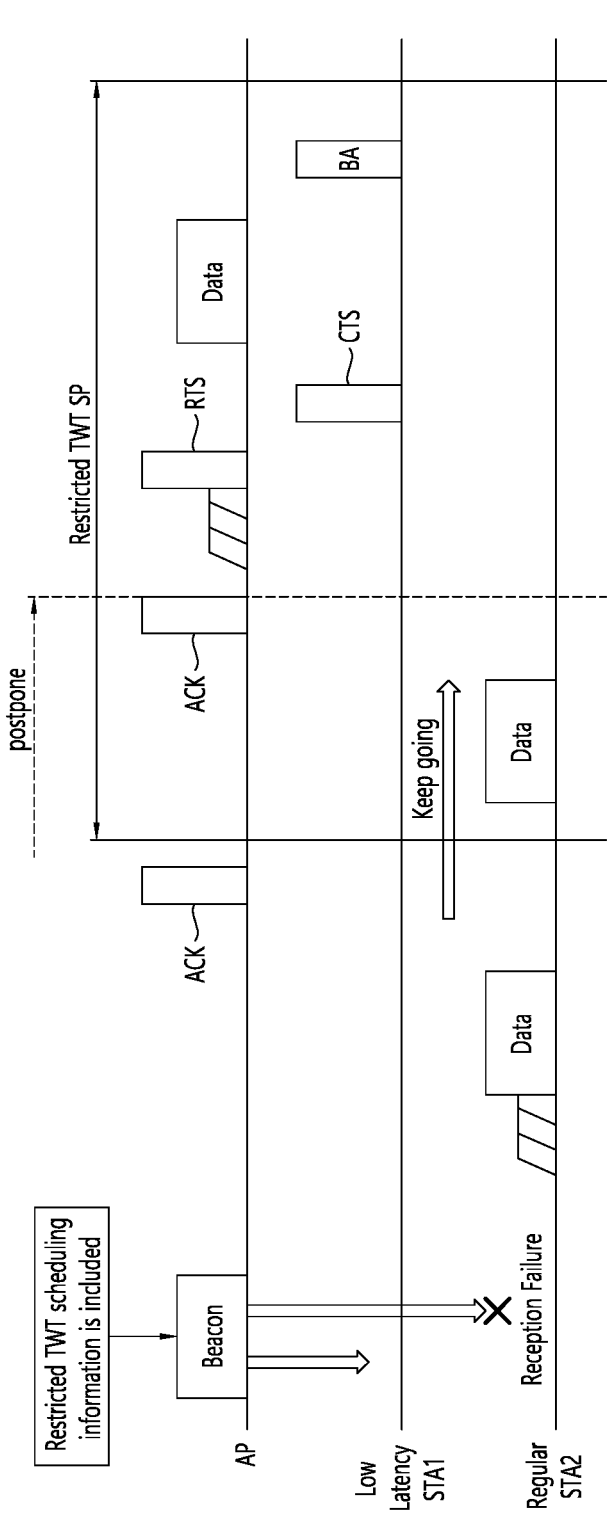
FIG. 15 illustrates an example of a case in which a regular STA does not receive a signal including restricted TWT scheduling information.

FIG. 15 illustrates an example of a case in which a regular STA does not receive a signal including restricted TWT scheduling information. Here, the example of FIG. 15 is an example in which the signal is configured in a beacon frame format.

Referring to FIG. 15, the AP transmits a beacon frame. Here, the beacon frame may include restricted TWT scheduling information. The restricted TWT scheduling information may include scheduling information for restricted TWT operation of low-latency STA1.

At this time, while the low-delay STA1 receives the beacon frame, the regular STA2 may not be able to receive the beacon frame due to external environmental factors, internal temporary errors, and the like. After obtaining a transmission opportunity (TXOP) based on a backoff operation, the regular STA2 may transmit data within the TXOP.

The regular STA2 may terminate/end its TXOP before a restricted TWT service period (SP) starts. In addition, the regular STA2 may resume data transmission after the restricted TWT SP ends. At this time, the transmission of the data may be resumed within the TXOP obtained based on the additional backoff operation. Alternatively, transmission of the data may be resumed within the TXOP based on the fact that the TXOP, which was terminated before the restricted TWT SP started, is resumed after the restricted TWT SP is terminated.

However, referring to FIG. 15, since the regular STA2 did not receive the beacon frame, that is, did not obtain the restricted TWT SP scheduling information, even after the start time/point of the restricted TWT SP has elapsed, there may be cases in which the data is continuously transmitted without terminating its own TXOP. In this case, the low-latency STA1 may not be able to perform transmission and reception operations within the restricted TWT SP allocated to it. In addition, in this case, the start time/point of the restricted TWT SP may be postponed/delayed to the time when the data transmission operation of the regular STA2 and/or the ACK transmission operation of the AP ends.

The main purpose of restricted TWT based on broadcast TWT is to allow a low latency device to quickly transmit latency sensitive traffic when it wants. In the case of FIG. 15, due to data transmission of a regular STA, the low-latency STA may enter a standby state and may not be able to perform data transmission in a scheduled restricted TWT SP. Accordingly, failure of reception of a beacon frame by a regular STA may delay transmission of latency-sensitive traffic/data. Accordingly, the present specification proposes a method in which a general STA can obtain corresponding scheduling information (e.g., the restricted TWT scheduling information, etc.) even in the situation shown in FIG. 15.

For an STA (non-AP STA or AP) that has not received a beacon frame including restricted TWT scheduling information transmitted by an AP, a frame other than a beacon frame including information for a separate restricted TWT SP may be transmitted. An STA that has not received the beacon frame may obtain information for the restricted TWT SP upon receiving the corresponding frame. The corresponding frame may be an announcement message, and the corresponding frame may be transmitted by at least one of methods described later. As a method for the STA to receive a corresponding frame from the AP, an unsolicited method and a solicited method may be considered.

Figure 16:
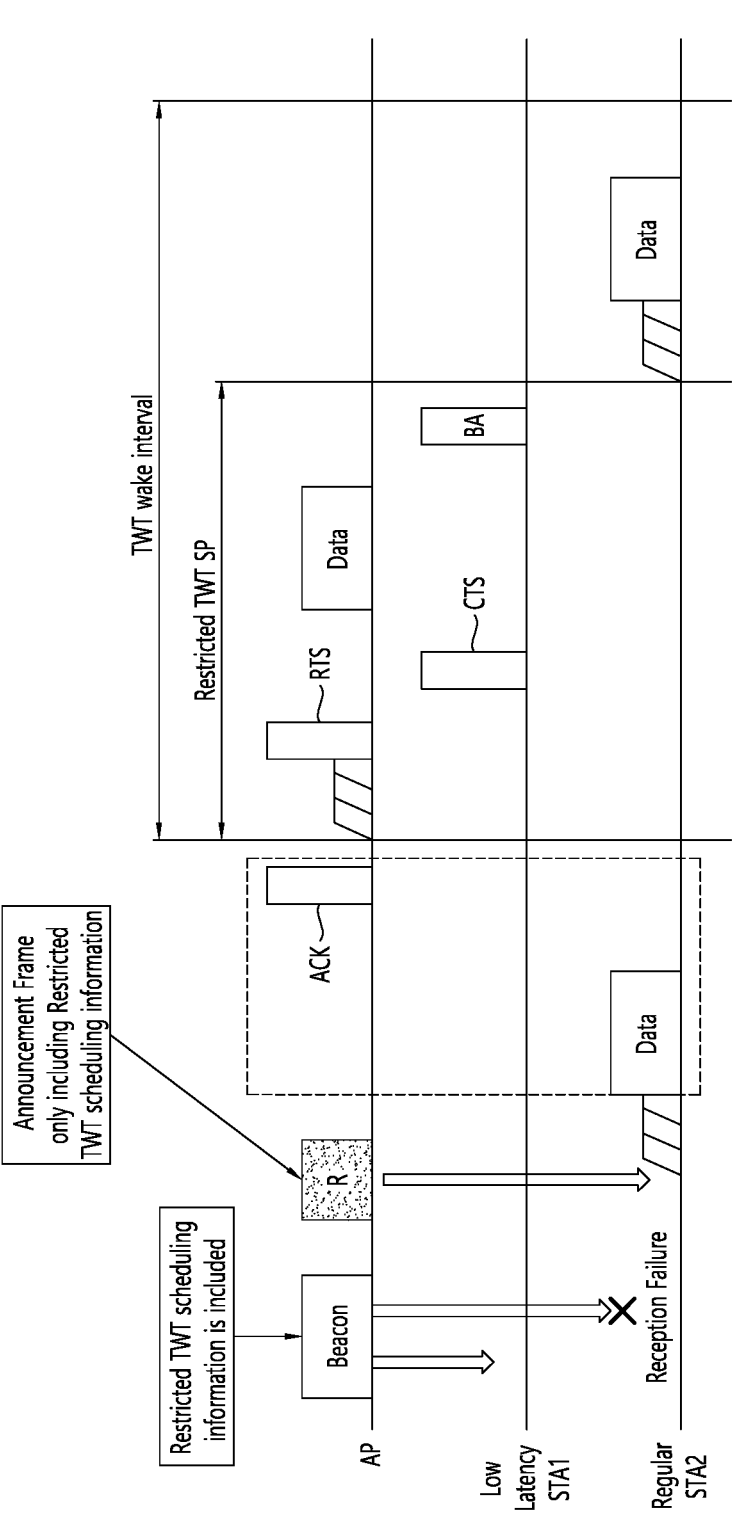
FIG. 16 shows an example in which the unsolicited method is applied.

(Unsolicited method) The AP may broadcast including information for the restricted TWT SP in a frame other than the beacon frame (e.g., existing management/action/control/data frame, new management/action/control/data frame, etc.). The corresponding frame may include only restricted TWT scheduling information without additional information. Alternatively, the corresponding frame may include other information as well as scheduling information of the restricted TWT. The frame may be transmitted at a period shorter than the Beacon Interval, and may be transmitted one or more times before the corresponding restricted TWT SP starts. Information included in the corresponding frame may be the same as restricted TWT scheduling information specified in the beacon frame, but may be changed. FIG. 16 shows an example in which the unsolicited method is applied.

Referring to FIG. 16, the AP transmits a beacon frame. Here, the beacon frame may include restricted TWT scheduling information. The restricted TWT scheduling information may include scheduling information for restricted TWT operation of low-latency STA1.

At this time, while the low-delay STA1 receives the beacon frame, the regular STA2 may not be able to receive the beacon frame due to external environmental factors, internal temporary errors, and the like. The regular STA2 may transmit data within the TXOP after obtaining a transmission opportunity (TXOP) based on a backoff operation.

The Regular STA2 may terminate its TXOP before a restricted TWT service period (SP) starts. However, as shown in FIG. 15, referring to FIG. 16, since the Regular STA2 did not receive the beacon frame, that is, did not obtain the restricted TWT SP scheduling information, even after the start time/point of the restricted TWT SP has elapsed, there may be a case where the data is continuously transmitted without terminating its own TXOP.

Here, based on the aforementioned unsolicited method, a specific frame may be transmitted from the AP without a request from the STA. The specific frame may be an announcement frame ('R' frame in FIG. 16) including only restricted TWT scheduling information. However, unlike FIG. 16, the announcement frame may include other information as well as restricted TWT scheduling information.

Referring to FIG. 16, the Regular STA2 may receive the announcement frame. In addition, the restricted TWT scheduling information may be obtained based on the announcement frame. Accordingly, the Regular STA2 may terminate its TXOP before the restricted TWT service period (SP) starts.

(Solicited method) The STA that has not received the beacon frame transmitted by the AP may check whether a restricted TWT SP to be proceeded exists and transmit request information and/or a request frame (e.g., existing management/action/control/data frame, new management/action/control/data frame, etc.) for receiving related information to the AP. The AP may transmit the request information and/or a response frame to the request frame. The response frame may include information related to a scheduled restricted TWT SP. Hereinafter, examples in which the STA transmits the request information and/or the request frame to the AP are described.

24

Figure 17:
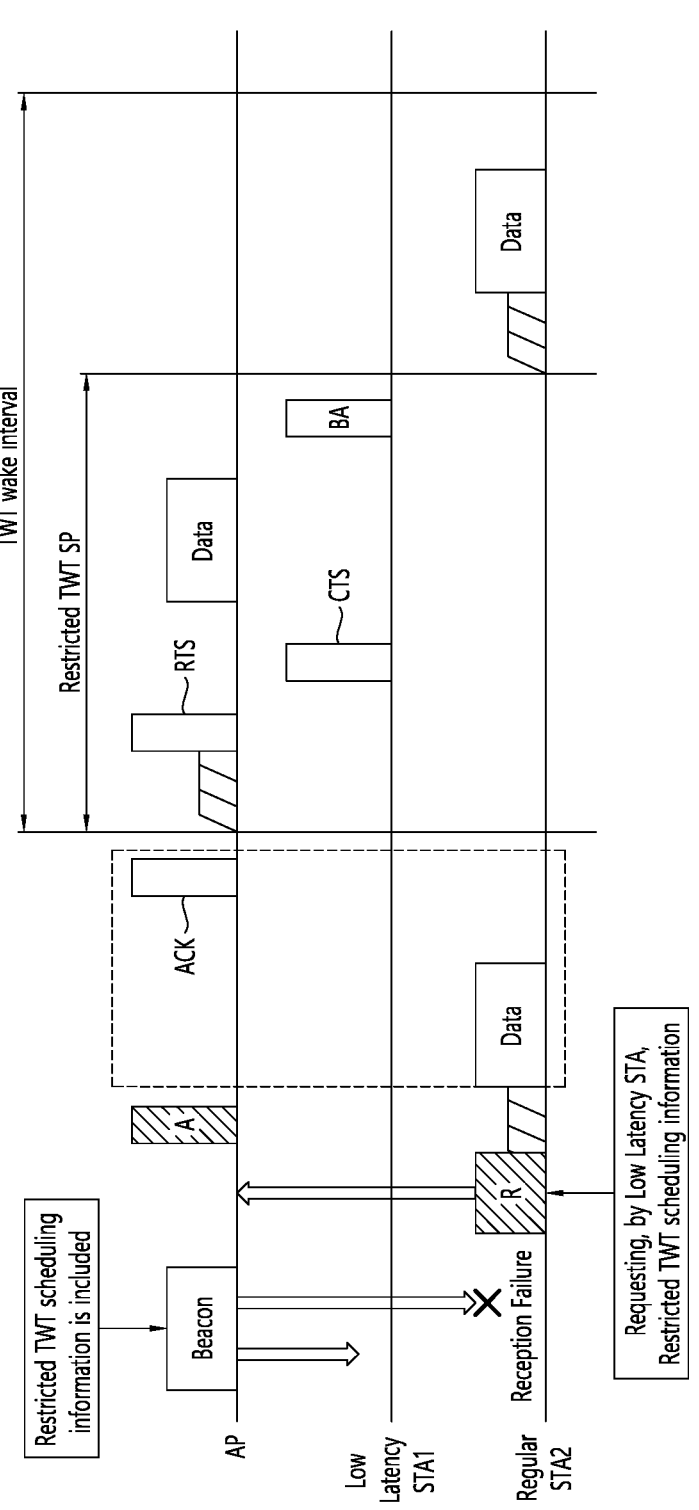
FIG. 17 shows an example of a Solicited method of restricted TWT scheduling information performed by an STA.

As an example of the solicited method, the request information may be included in a separate message and transmitted. Before starting its own TXOP, in order to determine whether there is a restricted TWT SP that must be performed in the near future, the STA may request restricted TWT scheduling information of the low-delay STA from the AP. In response to the request, the AP may transmit information related to the restricted TWT SP scheduled by the AP to the corresponding STA. Based on the information received from the AP, the STA may suspend/terminate its TXOP before the restricted TWT SP starts. FIG. 17 shows an example of a Solicited method of restricted TWT scheduling information performed by an STA.

Referring to FIG. 17, the AP transmits a beacon frame. Here, the beacon frame may include restricted TWT scheduling information. The restricted TWT scheduling information may include scheduling information for restricted TWT operation of low-latency STA1.

At this time, while the low-delay STA1 receives the beacon frame, the regular STA2 may not be able to receive the beacon frame due to external environmental factors, internal temporary errors, and the like. The regular STA2 may transmit data within the TXOP after obtaining a transmission opportunity (TXOP) based on a backoff operation. Since the Regular STA2 did not receive the beacon frame, that is, did not obtain the restricted TWT SP scheduling information, even after the start time/point of the restricted TWT SP has elapsed, there may be a case where the data is continuously transmitted without terminating its own TXOP.

Here, referring to FIG. 17, the Regular STA2 may transmit request information to the AP. The request information may be information requesting restricted TWT schedule information of the low-latency STA. The AP receiving the request information may transmit a response frame for the request information. The response frame may include information related to a scheduled restricted TWT SP. For example, the response frame may include information related to the restricted TWT SP configured for the low-latency STA1. Regular STA2 receiving the response frame may terminate its TXOP before the start time/point of the restricted TWT SP configured for the low-latency STA1.

If the low-delay STA does not receive the beacon frame, in order to check the scheduling information of its low-delay TWT and/or the scheduling information of the restricted TWT of other low-delay STAs, the low-latency STA may request information of the restricted TWT from the AP. Based on the information on the restricted TWT SP, the low-latency STA may perform its own restricted TWT operation or request additional restricted TWT scheduling from the AP.

Figure 18:
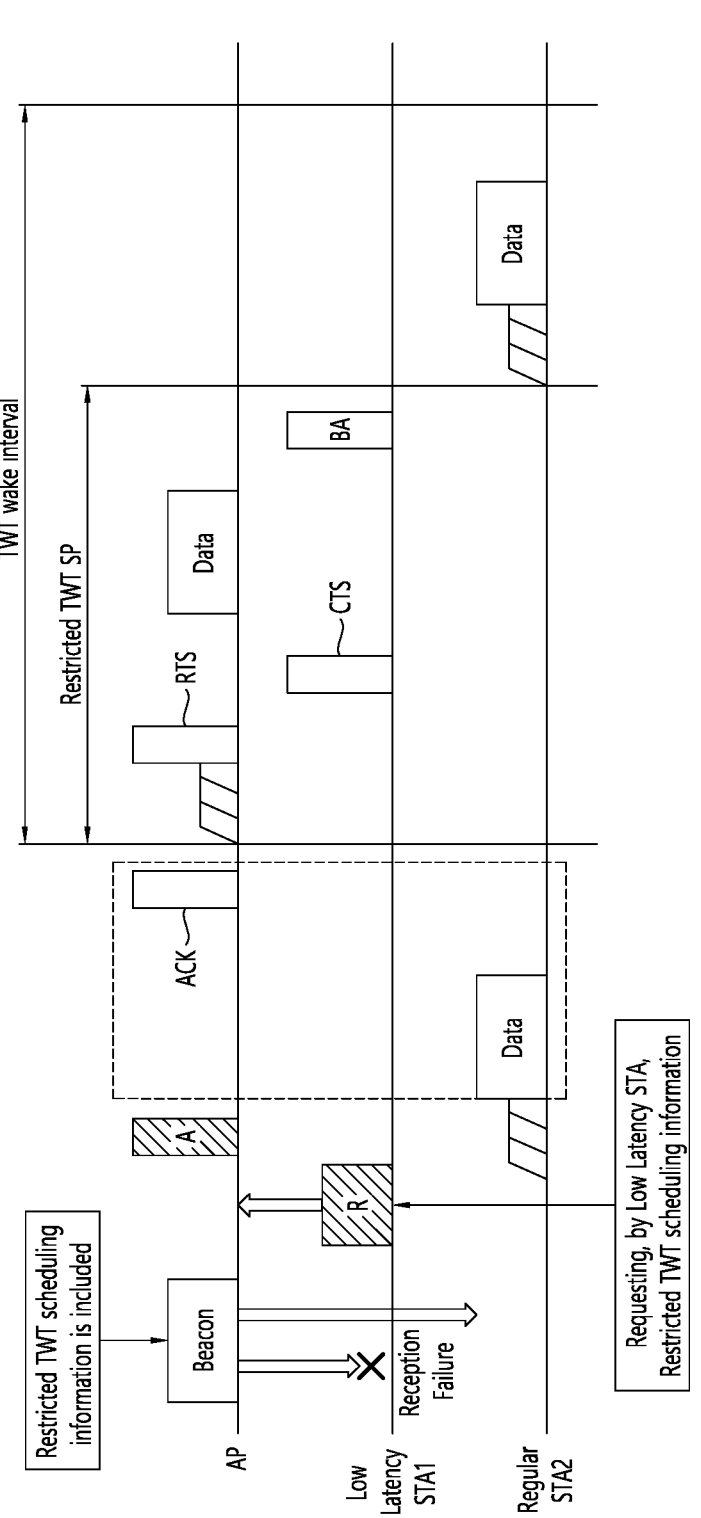
FIG. 18 shows another example of a Solicited method of restricted TWT scheduling information performed by an STA.

FIG. 18 shows another example of a Solicited method of restricted TWT scheduling information performed by an STA. Unlike FIG. 17, an example of FIG. 18 is an example of a case where the low-latency STA does not receive a beacon frame.

Referring to FIG. 18, the AP transmits a beacon frame. Here, the beacon frame may include restricted TWT scheduling information. The restricted TWT scheduling information may include scheduling information for restricted TWT operation of low-latency STA1.

At this time, while the regular STA2 receives the beacon frame, the low-delay STA1 may not be able to receive the beacon frame due to external environmental factors, internal temporary errors, and the like. The regular STA2 may transmit data within the TXOP after obtaining a transmission opportunity (TXOP) based on a backoff operation. However, referring to FIG. 18, the low-delay STA1 that has not received the beacon frame may not be able to transmit and receive data within its own restricted TWT SP.

Here, referring to FIG. 18, the low-delay STA1 that does not receive the beacon frame may transmit request information to the AP. The request information may be information requesting restricted TWT schedule information for the low-delay STA1 or information requesting restricted TWT schedule information for low-delay STAs including the low-delay STA1.

In response to the request information, the AP may transmit a response frame. The response frame may include restricted TWT schedule information for the low-delay STA1 or restricted TWT schedule information for low-delay STAs including the low-delay STA1. The low-latency STA1 receiving the response frame may check its own restricted TWT SP. Therefore, within the restricted TWT SP, the low-latency STA1 may perform data transmission and reception.

Figure 19:
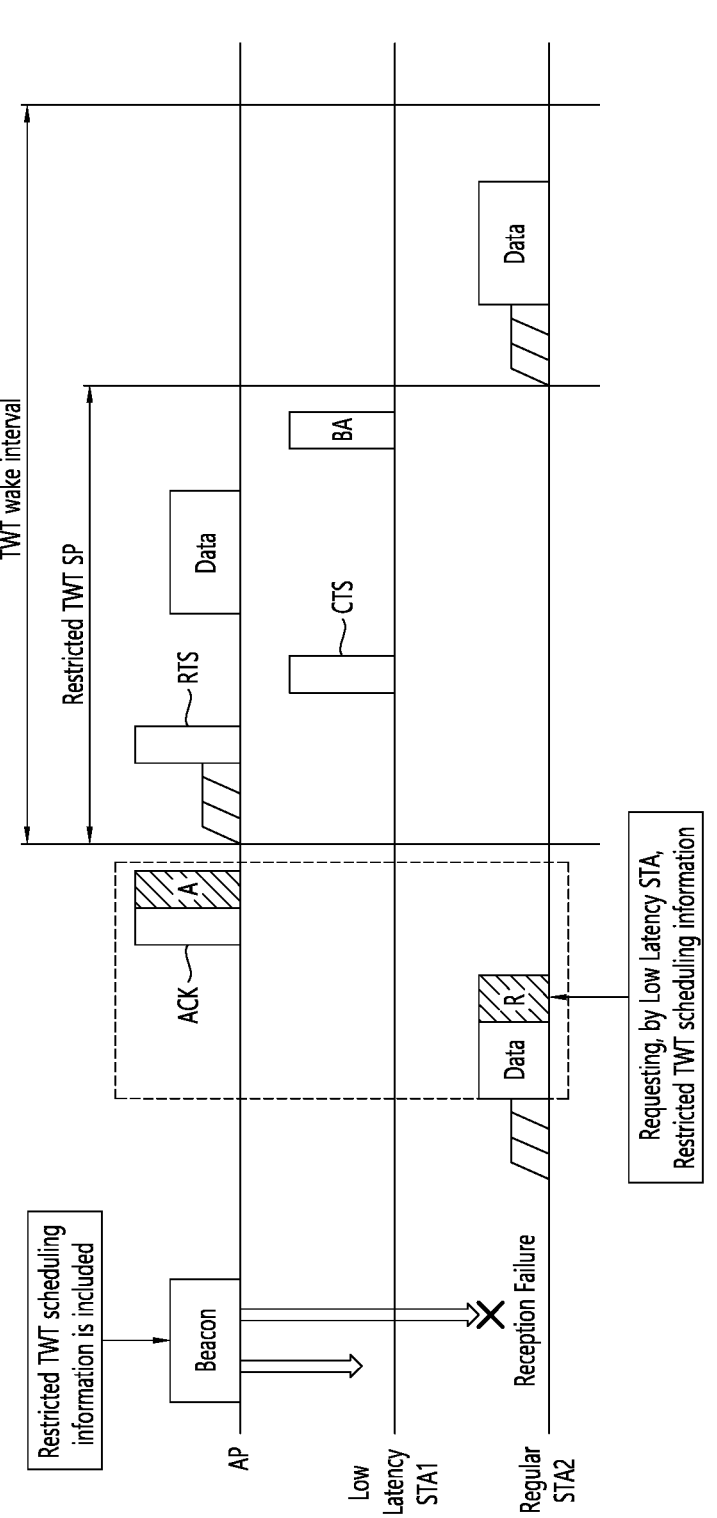
FIG. 19 shows another example of a Solicited method of restricted TWT scheduling information performed by an STA.

As another example of the solicited method, the request information may be included in an existing frame and/or message. The regular STA may include request information for the restricted TWT scheduling information of the low-latency STA in the existing transmission data. The AP receiving the request information may transmit information related to the restricted TWT SP scheduled by the AP together with ACK/BA (BlockACK). Based on the information received from the AP, the regular STA may suspend/terminate its TXOP prior to the restricted TWT SP. FIG. 19 shows another example of a Solicited method of restricted TWT scheduling information performed by an STA.

Referring to FIG. 19, the AP transmits a beacon frame. Here, the beacon frame may include restricted TWT scheduling information. The restricted TWT scheduling information may include scheduling information for restricted TWT operation of low-latency STA1.

At this time, while the low-delay STA1 receives the beacon frame, the regular STA2 may not be able to receive the beacon frame due to external environmental factors, internal temporary errors, and the like. The regular STA2 may obtain a transmission opportunity (TXOP) based on a backoff operation and perform transmission of data within the TXOP. Since the Regular STA2 did not receive the beacon frame, that is, did not obtain the restricted TWT SP scheduling information, even after the starting point of the restricted TWT SP has elapsed, there may be a case where the data is continuously transmitted without terminating its own TXOP.

Here, referring to FIG. 19, the Regular STA2 may include request information in its data and transmit it to the AP. The request information may be information requesting restricted TWT schedule information for low-delay STAs. In response to the request information, the AP may transmit ACK for the data and response information to the request information together to the Regular STA2. The response information may include information related to a restricted TWT SP scheduled by the AP. Therefore, the Regular STA2 that has not received the beacon frame may terminate its TXOP before the start time of the restricted TWT SP based on the information on the restricted TWT SP included in the response information.

Meanwhile, the request information may be included in an aggregated-Control (A-Control) field of the MAC header. Alternatively, the request information may be composed of elements of an action frame. At this time, the data including the request information may be configured in the structure of an MPDU (i.e., A-MPDU) in which an action frame is added to the data MPDU.

Figure 20:
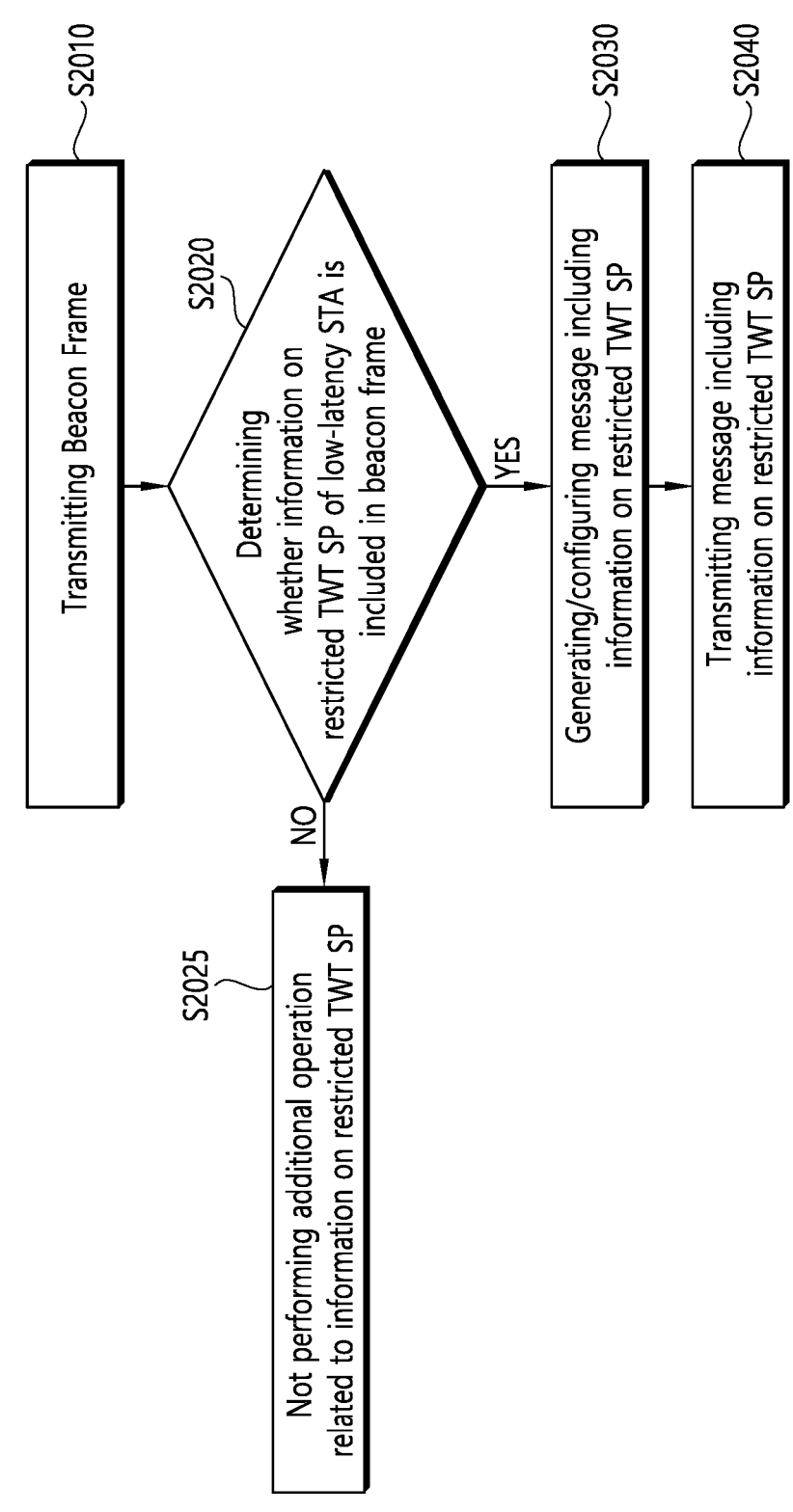
FIG. 20 is a flowchart of an example of an operation of an AP based on an unsolicited method.

Examples of operation of an apparatus according to some implementations of the present specification are described below. FIG. 20 is a flowchart of an example of an operation of an AP based on an unsolicited method.

Referring to FIG. 20, the AP transmits a beacon frame (S2010). Thereafter, the AP determines whether information on the restricted TWT SP of the low-latency STA is included in the previously transmitted beacon frame (S2020).

If the beacon frame does not include information related to the restricted TWT SP of the low-latency STA, the AP does not perform an additional operation related to the information on the restricted TWT SP (S2025). If the beacon frame includes information related to the restricted TWT SP of the low-latency STA, the AP generates/configures a message including information related to the restricted TWT SP (S2030). Here, the information related to the restricted TWT SP may be restricted TWT scheduling information. The message may be a message having a size smaller than that of general/normal data.

The AP transmits a message including information related to the restricted TWT SP (S2040). For example, the AP may periodically transmit to the EHT non-AP STA associated with the corresponding AP based on a self-set period or a predefined period on a beacon interval. Through this, STAs that have not received a beacon frame due to an unavoidable situation can also recognize restricted TWT scheduling.

Figure 21:
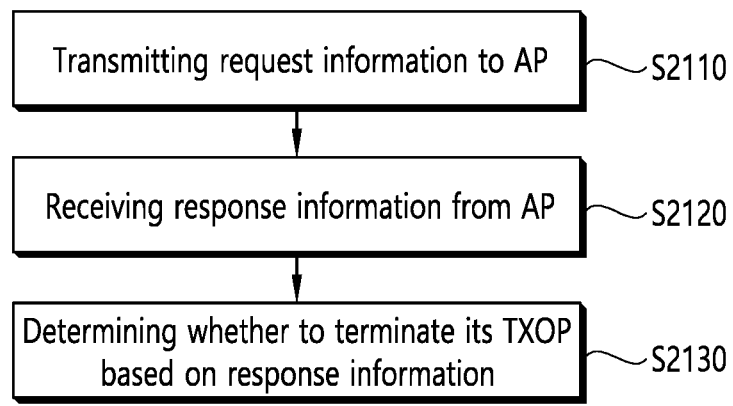
FIG. 21 is a flowchart of an example of an operation of an STA based on a Solicited method.

FIG. 21 is a flowchart of an example of an operation of an STA based on a Solicited method.

Referring to FIG. 21, the STA transmits request information to the AP (S2110). Here, the request information may be information requesting information related to presence and/or absence of the restricted TWT SP of the low-delay STA scheduled in the intra-BSS.

The STA receives response information from the AP (S2120). The response information may indicate whether a restricted TWT SP scheduled in the intra-BSS exists. Also, the response information may be transmitted through the response frame of FIGS. 17 and/or 18.

The STA determines whether to suspend/terminate its TXOP based on the response information (S2130). For example, when the response information informs that there is no restricted TWT SP scheduled in the intra-BSS, the STA may not suspend/terminate its TXOP. Alternatively, when the response information indicates that a restricted TWT SP scheduled in the intra-BSS exists, the STA may suspend/terminate its TXOP. Furthermore, based on the TXOP termination/suspension criterion set for the STA, the STA may determine whether to suspend/terminate its TXOP.

Figure 22:
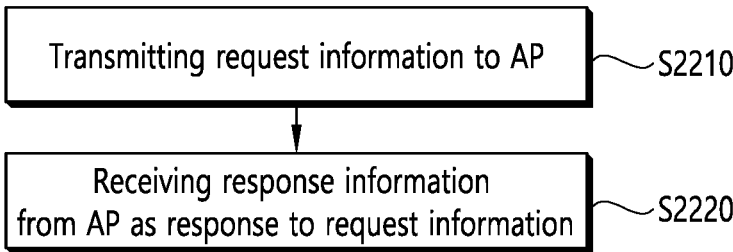
FIG. 22 is a flowchart of an example of a method performed by an STA in a wireless LAN system according to some implementations of the present specification.

FIG. 22 is a flowchart of an example of a method performed by an STA in a wireless LAN system according to some implementations of the present specification.

Referring to FIG. 22, the STA transmits request information to the AP (S2210). Here, the STA may transmit the request information to the AP when the STA fails to receive a beacon frame including restricted TWT scheduling information from the AP. Here, the request information may be information for requesting transmission of the restricted TWT scheduling information.

The STA receives response information from the AP as a response to the request information (S2220). Here, the response information may include the restricted TWT scheduling information. In addition, the restricted TWT scheduling information may include information related to restricted TWT SPs.

Based on the fact that the STA is an STA that has obtained a TXOP before the start time of the restricted TWT SP, the STA may terminate the TXOP before the start time. In addition, based on the presence of latency-sensitive traffic for the STA, the STA may transmit/receive the latency-sensitive traffic within the restricted TWT SP.

Figure 23:
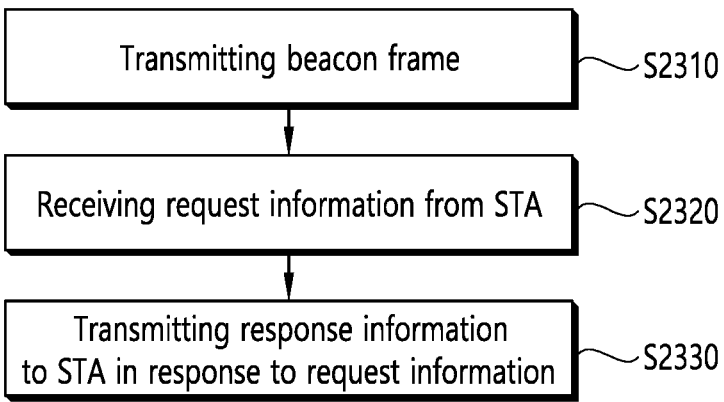
FIG. 23 is a flowchart of an example of a method performed by an AP in a wireless LAN system according to some implementations of the present specification.

FIG. 23 is a flowchart of an example of a method performed by an AP in a wireless LAN system according to some implementations of the present specification.

Referring to FIG. 23, the AP transmits a beacon frame (S2310). Here, the beacon frame may include first restricted TWT scheduling information.

The AP receives request information from the STA (S2320). Here, the STA may transmit the request information to the AP when the STA fails to obtain the first restricted TWT scheduling information through a beacon frame transmitted from the AP. For example, when the STA fails to receive the beacon frame and/or when the STA fails to decode the beacon frame, the STA may transmit the request information to the AP.

The AP transmits response information to the STA in response to the request information (S2330). Here, the response information may include second restricted TWT scheduling information. The second restricted TWT scheduling information included in the response information may be the same as the first restricted TWT scheduling information. Alternatively, the second restricted TWT scheduling information included in the response information may be different from the first restricted TWT scheduling information.

The technical features of the present specification described above may be applied to various devices and methods. For example, the technical features of the present specification described above may be performed/supported through the device of FIGS. 1 and/or 11. For example, the technical features of the present specification described above may be applied only to a part of FIGS. 1 and/or 11. For example, the technical features of the present specification described above are implemented based on the processing chips 114 and 124 of FIG. 1, or implemented based on the processors 111 and 121 and the memories 112 and 122 of FIG. 1, may be implemented based on the processor 610 and the memory 620 of FIG. 11.

Technical features of the present specification may be implemented based on a computer readable medium (CRM). For example, the CRM proposed by this specification is at least one computer readable medium containing instructions based on being executed by at least one processor.

The CRM may store instructions that perform operations comprising: transmitting request information to an access point (AP), wherein the request information is information requesting transmission of restricted Target Wake Time (TWT) scheduling information, wherein the restricted TWT scheduling information includes information related to a restricted TWT service period (SP); and receiving response information from the AP in response to the request information, wherein the response information includes the restricted TWT scheduling information At least one processor related to the CRM of the present specification may be the processors 111 and 121 or the processing chips 114 and 124 of FIG. 1 or the processor 610 of FIG. 11. Meanwhile, the CRM of this specification may be the memories 112 and 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method in a Wireless Local Area Network (WLAN) system, the method comprising:

based on a failure to receive a beacon frame including restricted Target Wake Time TWT) scheduling information related to a restricted TWT service period (SP), transmitting, by a non-access point (non-AP) station (STA), request information for requesting transmission of the restricted TWT scheduling information to an access point (AP); and receiving, by the non-AP STA, response information from the AP, wherein the response information includes the restricted TWT scheduling information.

2. The method of claim 1, wherein based on the non-AP STA supporting transmission of latency-sensitive data, the non-AP STA transmits or receives the latency-sensitive data in the restricted TWT SP, wherein based on the non-AP STA supporting transmission of data that is not the latency-sensitive data, the non-AP STA obtaining a transmission opportunity (TXOP) terminates the TXOP before a start time of the restricted TWT SP based on the restricted TWT scheduling information.

3. The method of claim 1, wherein the request information is transmitted through a frame containing data.

4. The method of claim 3, wherein the response information is transmitted through an acknowledgment (ACK) signal for the data.

5. The method of claim 3, wherein the request information is included in a medium access control (MAC) header of the frame.

6. The method of claim 1, wherein the request information is transmitted through one of a management frame, an action frame, or a control frame.

7. The method of claim 1, wherein the beacon frame is transmitted from the AP.

8. A non-access point (non-AP) station (STA) in a Wireless Local Area Network (WLAN) system, the non-AP STA comprising:

a memory;

a transceiver; and a processor operatively coupled to the memory and the transceiver, wherein the processor is adapted to:

based on a failure to receive a beacon frame including restricted Target Wake Time (TWT) scheduling information related to a restricted TWT service period (SP), transmit request information for requesting transmission of the restricted TWT scheduling information to an access point (AP); and receive response information from the AP, wherein the response information includes the restricted TWT scheduling information.

9. A method in a Wireless Local Area Network (WLAN) system, the method comprising:

based on a failure to receive a beacon frame including restricted Target Wake Time (TWT) scheduling information related to a restricted TWT service period (SP), receiving, by an access point (AP), request information for requesting transmission of the restricted TWT scheduling information from a non-access point (non-AP) station (STA); and transmitting, by the AP, response information to the non-AP STA, wherein the response information includes the restricted TWT scheduling information.

10. The method of claim 9, wherein, wherein based on the non-AP STA supporting transmission of latency-sensitive data, the non-AP STA transmits or receives the latency-sensitive data in the restricted TWT SP, wherein based on the non-AP STA supporting transmission of data that is not latency-sensitive data, the non-AP STA obtaining a transmission opportunity (TXOP) terminates the TXOP before a start time of the restricted TWT SP based on the restricted TWT scheduling information.

11. The method of claim 9, wherein the request information is transmitted through a frame containing data.

12. The method of claim 11, wherein the response information is transmitted through an acknowledgment (ACK) signal for the data.

13. The method of claim 11, wherein the request information is included in a medium access control (MAC) header of the frame.

14. The method of claim 9, wherein the request information is transmitted through one of a management frame, an action frame, or a control frame.

15. The method of claim 9, wherein the beacon frame is transmitted from the AP.

* * * * *